United States Patent [19]
Donohue et al.

[11] 3,818,767
[45] June 25, 1974

[54] PASSIVE DUAL-SPIN MISALIGNMENT COMPENSATORS

[75] Inventors: James H. Donohue, Ellicott City; Benjamin G. Zimmerman, Forest Heights, both of Md.

[73] Assignee: The United States of America as represented by the Administrator of the National Aeronautics and Space Administration, Washington, D.C.

[22] Filed: Sept. 29, 1972

[21] Appl. No.: 293,739

[52] U.S. Cl. .................................. 74/5.5, 244/1 SA
[51] Int. Cl. ........................................... G01c 19/02
[58] Field of Search .......... 74/5.5, 5.42, 5.47, 5.41; 244/1 SA; 188/1 B

[56] References Cited
UNITED STATES PATENTS

| | | | |
|---|---|---|---|
| 3,393,555 | 7/1968 | Flannelly | 188/1 B |
| 3,442,468 | 5/1969 | Iorillo | 244/1 SA |
| 3,564,931 | 2/1971 | Humphrey | 74/5.5 |

*Primary Examiner*—Manuel A. Antonakas
*Attorney, Agent, or Firm*—R. F. Kempf; John R. Manning

[57] ABSTRACT

In combination with a "dual-spin" gyroscopically stabilized device having a spinning rotor and a non-spinning platform two substantially lossless mechanical resonators, resonant at the spin frequency, are orthogonally disposed on the platform for compensation for the disturbing torque acting on the platform due to rotor misalignment.

5 Claims, 4 Drawing Figures

PATENTED JUN 25 1974 3,818,767

PASSIVE DUAL-SPIN MISALIGNMENT COMPENSATORS

ORIGIN OF THE INVENTION

The invention described herein was made by employees of the United States Government and may be manufactured and used by or for The Government for governmental purposes without the payment of any royalties thereon or therefor.

BACKGROUND OF THE INVENTION

This invention relates to spin-stabilized devices of the "two-body" or "dual-spin" configuration comprising a spinning rotor and a stationary platform. In a space satellite, the rotor provides gyroscopic stabilization while the platform is used for the mounting of those instruments, for example, optical and electromagnetic transmitters and receivers, whose operation or function may be adversely affected by spinning. The platform, which is commonly referred to as "mechanically despun", must provide an extremely stable base for these instruments.

As is well known in the art, the rotor's spin axis ideally should both pass through its center of mass and contain its principal axis of inertia. It is a characteristic of gyroscopic stabilization that a disturbing torque, not parallel to this spin axis, induces "nutation" or "precession" of this desired spin axis. An impulsive torque applied to a "dual-spin" system induces "free precession" at a particular frequency determined only from the angular momentum of the spinning body and the system's tranverse inertia. In order to dissipate the energy of this precession, nutation dampers which are ideally tuned to the nutation frequency are disposed on the stationary platform. These dampers are lossy mechanical resonators which although maximally responding at the nutation frequency, provide damping at a fairly broad range of frequencies. Effectively, they dissipate the nutational energy, so that the orientation of the spin axis, and therefore the orientation of the platform, tends to be inertially fixed.

The rotor is coupled to the platform by a motor bearing assembly which determines the location of the spin axis with respect to the "dual spin" device. Any misalignment of the motor bearing assembly or unbalance of the rotor forces the spin axis, to be either skewed from the principal axis of inertia of the rotor or offset from the center of mass of the rotor. This misalignment or unbalance produces an additional disturbing torque acting on the platform which causes a "nodding" motion of the spin axis in addition to the "free precession" previously mentioned. This "nodding" occurs at the spin frequency rather than at the nutation frequency. The effect of the misalignment torque can be diminished by the nutation dampers but cannot be completely cancelled with the result that the state of the art platform is not as stationary as may be required.

It is an object of the present invention to provide passive means, in addition to nutation dampers, for opposing the disturbing torque acting on the platform which is due to rotor misalignment in order to achieve a high degree of stability of the platform.

SUMMARY OF THE INVENTION

The misalignment torque acting on the platform is directed perpendicular to the rotor's spin axis and rotates at the spin rate. If this rotating torque vector is resolved into components along two spacially orthogonal axes on the platform, it will be recognized that each of these components are sinusoidal functions of the spin frequency. In addition, these sinusoidal components are in phase quadrature. In accordance with the invention, two misalignment compensators, in the form of substantially lossless torsional mechanical resonators, resonant at the spin frequency, are disposed on the platform directed along spacially orthogonal axes. These resonators, starting from arbitrary initial conditions, eventually oppose exactly the misalignment torques, so that no net misalignment torque acts on the platform.

Other objects and features of the invention will be more fully apparent in the course of the following description and from an examination of the related drawings wherein:

FIG. 1 schematically depicts a perspective of a dual-spin device, such as a space satellite, showing the misalignment compensators of the invention mounted thereon.

FIG. 2 schematically shows the electrical circuit of an electrical analogy for analyzing the operation of the misalignment compensators of the invention.

DETAILED DESCRIPTION

Figure 1:
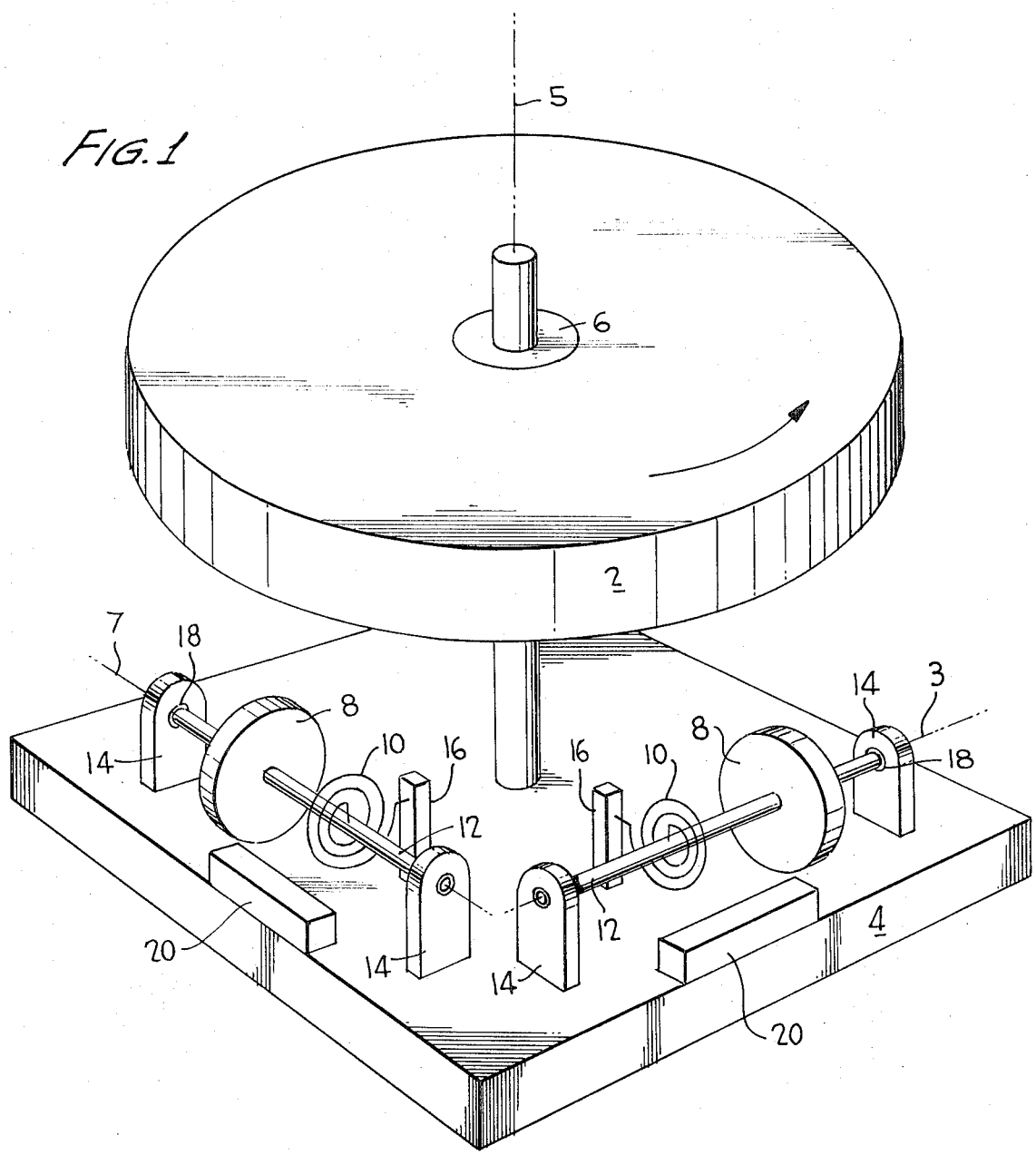

In FIG. 1, the rotor 2 for gyroscopic stabilization is rotably coupled to the stationary platform 4 by the motor bearing assembly 6. Two substantially lossless mechanical resonators are disposed on the platform directed along orthoronal axes 7 and 3 and each are also directed perpendicular to the spin axis of the "dual spin" system 5. It will be appreciated that these two orthogonally directed resonators may be combined into one sub-assembly. Each resonator is defined by a rotable mass 8, a torsional wire-like spring 10, and axle 12, axle supports 14, and a spring support 16. The rotable mass and the axle form a rigid assembly which is rotable in the axle supports through the action of bearing 18. The mass-axle assembly has a predetermined moment of inertia and it may be broadly considered as rotable with respect to the platform since the axle supports 14, are attached to the platform. One end of the torsional spring 10, is fixedly mounted to the axle 12, while the other end of the torsional spring is fixedly mounted to the platform 4 via the spring support 16. Torque due to the resonator, which is directed parallel to the axle, is coupled to the platform via the spring support 16. The torsional spring 10 provides a means for applying torque to the platform which is proportional to the rotation angle of the mass 8 with respect to the platform 4. The constant of proportionality is the spring constant.

Each resonator is capable of applying a sinusoidal torque to the platform. The combination of the two resonators therefore has the capability of canceling the rotating misalignment torque vector, since this vector consists of two spacially orthogonal components which are sinusoidal. Since the components of the misalignment torque vector are sinusoidal at the spin frequency, the resonators must be resonant at this frequency. Therefore the square root of the ratio of the spring constant of the torsional spring 10 to the moment of inertia of the rotable mass 8 must equal $2\pi$ times the spin frequency. The bandwidth of the substantially lossless resonators, although generally narrow, should be selected to encompass the range of expected spin frequency variation. This can be done by selection of the "Q" of the resonators. Since, in practical applications, some small amount of damping is unavoidable, the "Q" may be selected by varying the product of the spring constant and inertia while maintaining the ratio of these parameters constant.

Nutation dampers 20, which are required in addition to the misalignment compensators for stabilizing the platform, are shown mounted on the platform 4 directed along orthogonal axes.

Figure 2:
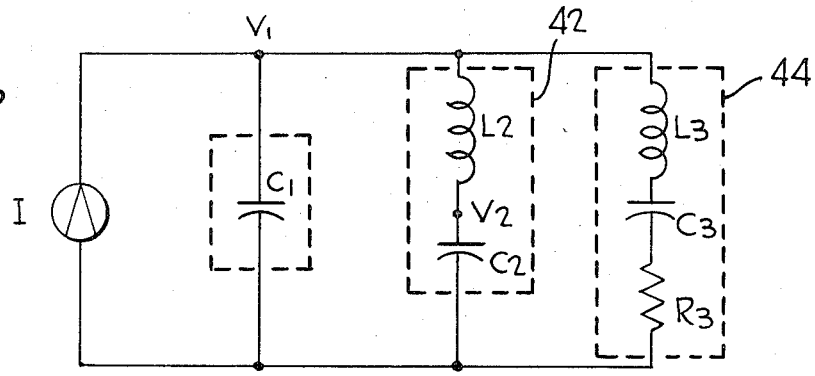

That the misalignment compensators are effective in eliminating the misalignment torques on the platform will be clear by considering the electrical analogy shown in FIG. 2 which analogizes the operation of one of misalignment compensators of the invention. In accordance with the analogy, the spin frequency sinusoidal current generator I, represents the sinusoidal component of the misalignment torque which is directed parallel to the axle of one of the misalignment compensators. The capacitance $C_1$ represents the moment of inertia of the platform along this direction and the voltage $V_1$ represents the angular velocity of the platform in this direction. The series resonator 42 represents a misalignment compensator and is resonant at the spin frequency. The inductance $L_2$ represents the inverse of the torsional spring constant while $C_2$ represents the moment of inertia of the rotable mass of the resonator. The angular velocity of the rotable mass of the misalignment compensator is represented by the voltage $V_2$. The lossy resonator composed of $L_3$, $C_3$, and $R_3$ is resonant at the nutation frequency and represents a nutation damper. As can be seen from FIG. 2, since the series resonator 42 which represents a misalignment compensator is resonant at the frequency of the current generator, it absorbs all the generator's current. Thus, by analogy, the angular velocity of the platform is zero while the angular velocity of the rotable mass, is such that all the torque acts upon it. Stated another way, the resonator produces a torque which completely opposes the misalignment torque.

Figure 3:
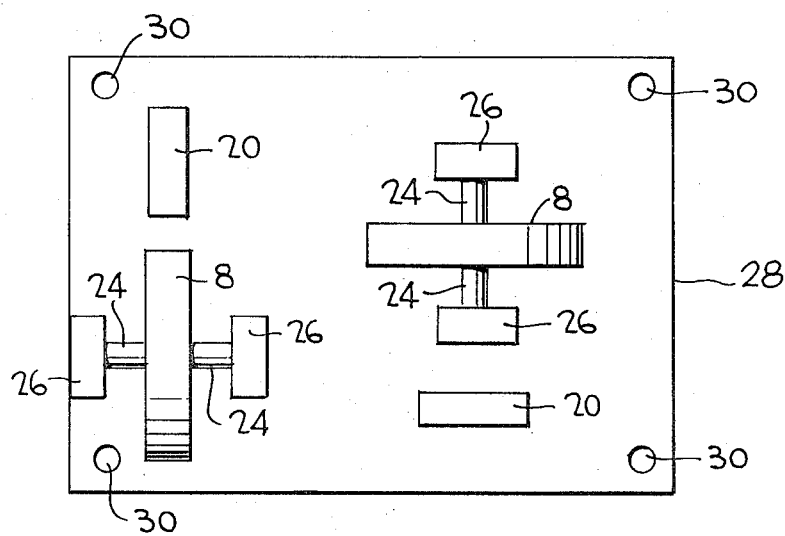
FIG. 3 shows a plan view of an assembly of two misalignment compensators of an alternate embodiment, said assembly also including nutation dampers.
Figure 4:
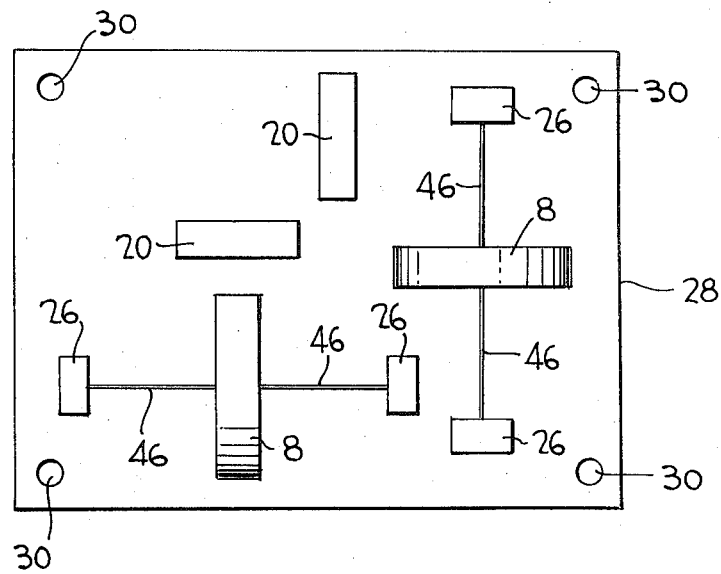
FIG. 4 shows a plan view of still another embodiment of the misalignment compensators in an assembly similar to FIG. 3.

FIG. 3 shows another embodiment of the misalignment compensators and indicates an assembly of the two compensators into one unit. In this embodiment the bearing 18 and torsional spring 10 are replaced by a pivot 24 at each end of the rotable mass 8. The pivot 24 has one end fixedly mounted in a bore in the rotable mass 8 and the other end fixedly mounted in a bore in the supports 26. This pivot is a commercially available item which has the characteristic of a torsional spring whose longitudinal axis can resist shear and bending forces. The supports 26 are attached to plate 28 which has holes 30 for mounting this assembly onto the platform. In this embodiment, the torques proportional to the rotation angle of the mass with respect to the plate are coupled to the platform via the pivots 24 and the supports 26. The spring constant of the resonator is the sum of the spring constants of the pivots at each end of the rotable mass 8. Thus, the pivots are springs which are in series. Nutation dampers 20 may advantageously be included in such an assembly since as the following discussion indicates there is cooperation between these parts:

Each of the misalignment compensators produces two types of output, a "forced output" in response to the misalignment torque excitation and a "free output" which may be thought of as an initial condition. This will be recognized by those skilled in the mathematics of differential equations. The "forced output" is the one which cancels the misalignment torque. The "free" outputs for these substantially lossless resonators are essentially undamped sinusoids. Since, the free outputs cause "nodding" of the entire device they will be damped out by the conventional damping mechanism which are otherwise required for device stability, leaving only the forced output. Thus starting from arbitrary initial conditions (an arbitrary free output), the misalignment compensators eventually provide a torque acting on the platform which exactly opposes the misalignment torque. Thus the combination of the substantially lossless resonators and the nutation damping lossy resonators produce torques to achieve a high degree of stability of the platform. FIG. 4 shows another alternate embodiment wherein the pivots 24 of FIG. 3 are replaced by a torsion wire suspension. There, tensioned wires 46 connect the rotable mass 8 to the supports 26. These wires act as torsional springs in a similar manner as the pivots 24 of FIG. 3.

Although several embodiments of this invention have been illustrated and described, it will be appreciated that modification is possible without departing from its spirit and scope, for example, the misalignment compensators instead of being torsional resonators may be linear resonators which are orientated parallel to the spin axis 5 (FIG. 1), and which are displaced from the spin axis in orthogonal directions by a predetermined lever arm. In this embodiment as well as those previously discussed, the resonators apply torque to the platform along orthogonal axes which axes are also perpendicular to the spin axis of the dual-spin configuration.

We claim:

1. In combination with a "dual-spin" gyroscopically stabilized device having a rotor spinning about a spin axis at an essentially constant spin rate which is rotatably coupled to a non-spinning platform, said dual spin device having nutation damping means, the improvement comprising:

A first mechanical resonator, resonant at a predetermined frequency equal to the spin rate, disposed on the platform so as to apply torque to said platform in a direction perpendicular to the spin axis; and A second mechanical resonator, resonant at said predetermined frequency and disposed on the platform so as to apply torque to said platform in a direction perpendicular both to the spin axis and to the direction of torque application of the first resonator.

2. The improvement of claim 1 where each of the mechanical resonators are substantially lossless.

3. The improvement of claim 1 wherein each of the mechanical resonators are torsional resonators comprising:

A mass which is rotable with respect to the platform; and spring means for applying torque to the platform proportional to the angle of rotation of the mass relative to the platform.

4. The improvement of claim 3 where the spring means comprises a wire coupling the mass to the platform.

5. The improvement of claim 3 where the spring means comprises two springs which are in series.

* * * * *